United States Patent
Kim et al.

(10) Patent No.: US 8,623,545 B2
(45) Date of Patent: Jan. 7, 2014

(54) RECHARGEABLE BATTERY

(75) Inventors: Sung-Bae Kim, Suwon-si (KR);
Yong-Sam Kim, Suwon-si (KR);
Sang-Won Byun, Suwon-si (KR);
Dae-Won Han, Suwon-si (KR);
Byung-Kyu Ahn, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 798 days.

(21) Appl. No.: 12/659,443

(22) Filed: Mar. 9, 2010

(65) Prior Publication Data

US 2010/0233528 A1   Sep. 16, 2010

(30) Foreign Application Priority Data

Mar. 11, 2009   (KR) .................. 10-2009-0020861

(51) Int. Cl.
*H01M 2/00* (2006.01)
*H01M 2/02* (2006.01)
*H01M 2/08* (2006.01)

(52) U.S. Cl.
USPC ............................ 429/178; 429/163; 429/182

(58) Field of Classification Search
None
See application file for complete search history.

(56) References Cited

U.S. PATENT DOCUMENTS

| 7,871,725 | B2 | 1/2011 | Nam et al. |
|---|---|---|---|
| 8,216,705 | B2 | 7/2012 | Cho et al. |
| 2003/0194609 | A1 | 10/2003 | Nam et al. |
| 2006/0093907 | A1 | 5/2006 | Jeon et al. |
| 2007/0154782 | A1 | 7/2007 | Cho et al. |
| 2007/0154802 | A1 | 7/2007 | Uh |
| 2009/0061306 | A1 | 3/2009 | Uh |
| 2009/0186269 | A1* | 7/2009 | Kim et al. ...................... 429/179 |
| 2011/0076554 | A1 | 3/2011 | Nam et al. |

FOREIGN PATENT DOCUMENTS

| CN | 1452257 A | 10/2003 |
|---|---|---|
| CN | 1753239 A | 3/2006 |
| JP | 2000-030690 A | 1/2000 |
| JP | 2002-334685 | 11/2002 |
| JP | 2003-317678 | 11/2003 |
| JP | 2006-093134 A | 4/2006 |

(Continued)

OTHER PUBLICATIONS

Chinese Office Action in CN 201010127078.1, dated Mar. 28, 2012 (Kim, et al.).

(Continued)

*Primary Examiner* — Milton I Cano
*Assistant Examiner* — Sarah A Slifka
(74) *Attorney, Agent, or Firm* — Lee & Morse, P.C.

(57) ABSTRACT

A battery includes a case housing an electrode assembly, the case having an opening for receiving the electrode assembly, a cap plate combined with the opening so as to close the case, a first insulator on an outer surface of the cap plate, an electrode terminal electrically connected to the electrode assembly, the electrode terminal extending through a first terminal hole in the cap plate and a second terminal hole in the first insulator, a first connection portion that mates the cap plate to the first insulator so as to oppose rotation of the first insulator relative to the cap plate, the first connection portion being eccentric with respect to a central line of the first terminal hole, and a second connection portion that mates the first insulator to the electrode terminal so as to oppose rotation of the electrode terminal relative to the first insulator.

19 Claims, 4 Drawing Sheets

(56) References Cited

FOREIGN PATENT DOCUMENTS

| | | |
|---|---|---|
| JP | 2008-251213 A | 10/2008 |
| KR | 10-0420761 B1 | 2/2004 |
| KR | 10 2006-0112743 A | 11/2006 |
| KR | 10-0696791 B1 | 3/2007 |
| KR | 10-0731414 B1 | 6/2007 |
| KR | 10 2007-0078859 A | 8/2007 |
| KR | 10-0880325 B1 | 1/2009 |

OTHER PUBLICATIONS

Japanese Office Action in JP 2010-050500, dated Oct. 2, 2012 (Kim, et al.).
European Office Action in EP 10155865.8-1227, dated May 24, 2011 (Kim, et al.).
Chinese Certificate of Patent dated Mar. 27, 2013.
Japanese Office Action dated May 14, 2013.

* cited by examiner

RECHARGEABLE BATTERY

This application claims the benefit of Korean Application No. 10-2009-0020861, filed Mar. 11, 2009, in Korea, the disclosure of which is incorporated herein by reference.

BACKGROUND

1. Field

Embodiments relate to a rechargeable battery.

2. Description of the Related Art

A high-capacity rechargeable battery may be used as a power supply for driving motors in hybrid vehicles, electric vehicles, and the like. The high-capacity rechargeable battery may include a plurality of rechargeable batteries forming unit cells that are electrically connected to each other, e.g., in series.

The rechargeable battery of the unit cell may include an electrode assembly formed of a positive electrode and a negative electrode with a separator therebetween. The rechargeable battery may further include an electrode terminal electrically connected to the electrode assembly and protruding outside a battery case that surrounds the electrode assembly. The electrode terminal may protrude through a terminal hole in a cap plate of the rechargeable battery.

The above information disclosed in this Background section is only for enhancement of understanding of the related art and is not an admission of prior art.

SUMMARY

Embodiments are directed to a rechargeable battery, which substantially overcome one or more problems arising from limitations and disadvantages of the related art.

It is therefore a feature of an embodiment to provide a battery including one or more structures engaging with one another and offset from a central line of an electrode terminal so as to reduce or eliminate relative rotation of the one or more structures and the electrode terminal.

At least one of the above and other features and advantages may be realized by providing a battery, including a case housing an electrode assembly, the case having an opening for receiving the electrode assembly, a cap plate combined with the opening so as to close the case, a first insulator on an outer surface of the cap plate, an electrode terminal electrically connected to the electrode assembly, the electrode terminal extending through a first terminal hole in the cap plate and a second terminal hole in the first insulator, a first connection portion that mates the cap plate to the first insulator so as to oppose rotation of the first insulator relative to the cap plate, the first connection portion being eccentric with respect to a central line of the first terminal hole, wherein the central line of the first terminal hole is axial to the first terminal hole and extends perpendicular to a plane of the first terminal hole, and a second connection portion that mates the first insulator to the electrode terminal so as to oppose rotation of the electrode terminal relative to the first insulator, the second connection portion being eccentric with respect to the central line of the first terminal hole.

The first connection portion may include a first protrusion that protrudes from the outer surface of the cap plate, and a first groove formed concavely on a facing surface of the first insulator in a location corresponding to the first protrusion, the first groove mating to the first protrusion.

The first protrusion may be between the first terminal hole and one end of the cap plate in the length direction.

The second connection portion may include a first polygonal groove in the first insulator, the first polygonal groove having a polygon shape that encompasses an area that extends beyond the second terminal hole, and a protrusion portion of the electrode terminal, the protrusion portion of the electrode terminal having a shape mating with the first polygonal groove.

The first polygonal groove and the protrusion may be offset to one end of the cap plate in the length direction so as to be eccentric with respect to the central line of the second terminal hole of the first insulator, and the first polygonal groove may have a rectangular shape.

The battery may further include a second insulator on an inner surface of the cap plate, the second insulator having a third terminal hole that is coaxial with the first terminal hole and corresponds to the electrode terminal, a current collecting member connected to the electrode assembly and having a fourth terminal hole corresponding to the electrode terminal, and a third connection portion between the cap plate and the second insulator, the third connection portion mating the cap plate to the second insulator and being eccentric with respect to the central line of the first terminal hole.

The third connection portion may include a second protrusion that protrudes from an outer surface of the second insulator, and a second groove formed concavely on a facing surface of the cap plate in a location corresponding to the second protrusion, the second groove mating to the second protrusion.

The battery may further include a fourth connection portion between the second insulator and the current collecting member, the fourth connection portion mating the second insulator to the current collecting member and being eccentric with respect to the central line of the first terminal hole.

The fourth connection portion may include a second polygonal groove in the second insulator, the second polygonal groove having a polygon shape that encompasses an area that extends beyond the third terminal hole, and a polygonal plate portion of the current collecting member, the polygonal plate having a shape mating with the second polygonal groove.

The second polygonal groove and the polygonal plate may be formed as a rectangle eccentric to one end of the cap plate in the length direction with respect to the third terminal hole.

The second polygonal groove may further include an extension groove, the polygonal plate may further include an extension portion, the extension groove and the extension portion may each extend away from the third terminal hole, and the extension groove may mate with the extension portion.

The first connection portion, the second connection portion, and the third connection portion may each be offset from the central line of the first terminal hole in a common direction.

The battery may further include a gasket that is interposed in the first terminal hole between the cap plate and the electrode terminal, in the second terminal hole between the first insulator and the electrode terminal, and in the third terminal hole between the second insulator and the electrode terminal.

The first connection portion and the second connection portion may each be offset from central line of the first terminal hole in a common direction.

At least one of the above and other features and advantages may also be realized by providing a battery, including a case housing an electrode assembly, the case having an opening for receiving the electrode assembly, a cap plate combined with the opening so as to close the case, an insulator on the outer surface of the cap plate, the insulator being supported against rotation of the insulator with respect to the cap plate by a flange at an external circumference of the cap plate, an electrode terminal electrically connected to the electrode assembly, the electrode terminal extending through a first terminal hole in the cap plate and a second terminal hole in the insulator, and a connection portion that mates the insulator to the electrode terminal so as to oppose rotation of the electrode terminal relative to the insulator, the connection portion being eccentric with respect to a central line of the first terminal hole, wherein the central line of the first terminal hole is axial to the first terminal hole and extends perpendicular to a plane of the first terminal hole.

The insulator may have at least one surface facing the flange, the at least one surface being supported by the flange.

The insulator may have a polygonal plate portion, the polygonal plate portion having three sides supported by the flange.

The connection portion may include a polygonal groove in the insulator, the polygonal groove having a polygon shape that encompasses an area that extends beyond the second terminal hole, and a protrusion portion of the electrode terminal, the protrusion having a shape mating with the polygonal groove.

The polygonal groove and the protrusion may be formed as a rectangle eccentric to one end of the cap plate in the length direction with respect to the second terminal hole.

BRIEF DESCRIPTION OF THE DRAWINGS

The above and other features and advantages will become more apparent to those of ordinary skill in the art by describing in detail example embodiments with reference to the attached drawings, in which.

DETAILED DESCRIPTION

Figure 1:
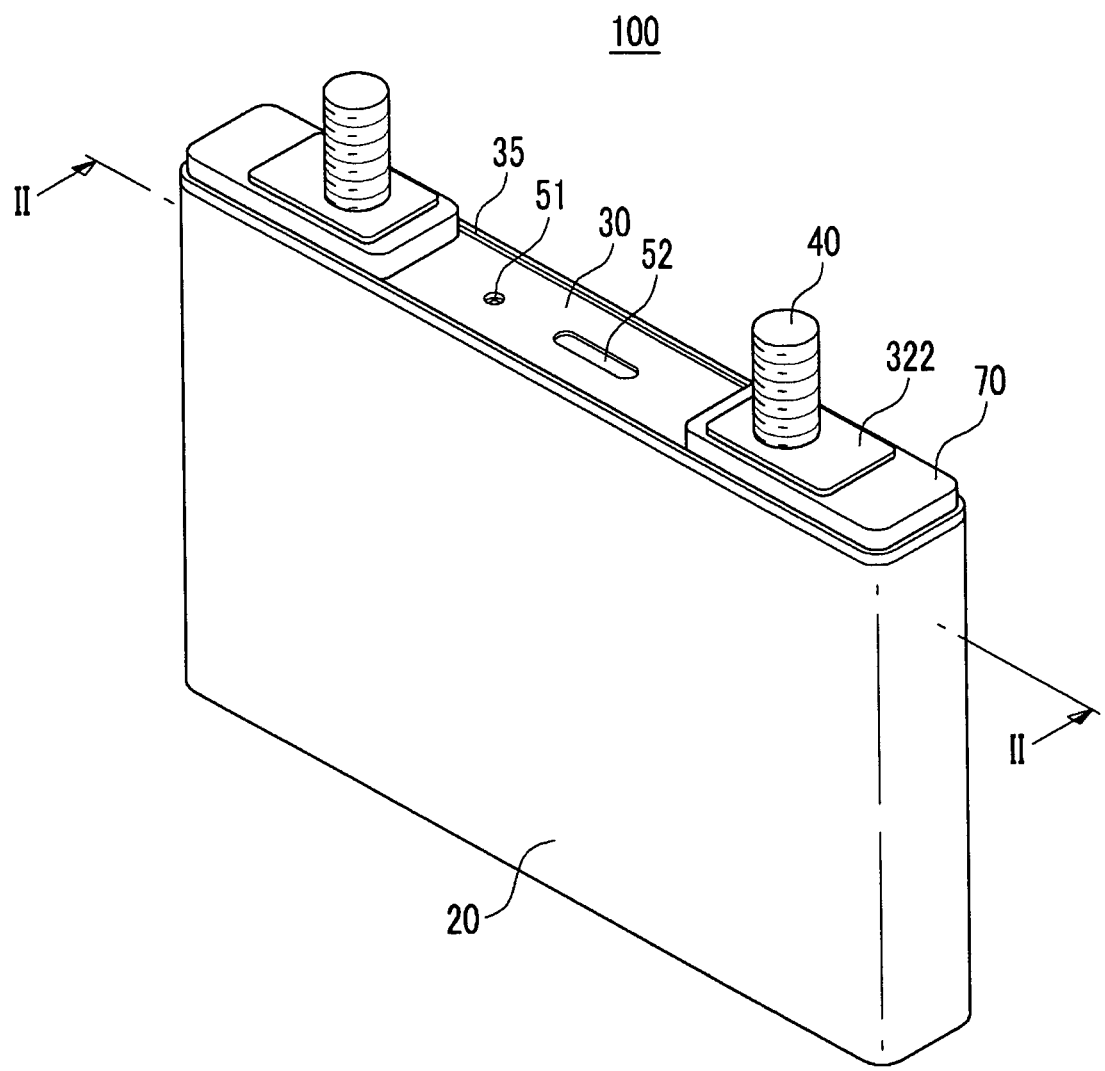
FIG. 1 illustrates a perspective view of a rechargeable battery according to a first example embodiment.

Korean Patent Application No. 10-2009-0020861, filed on Mar. 11, 2009, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. In the drawing figures, the dimensions of layers and regions may be exaggerated for clarity of illustration. Like reference numerals refer to like elements throughout.

Description of Reference Numerals Indicating Primary Elements, as Used in the Drawings:

| 100: | rechargeable battery |
| 10: | electrode assembly |
| 11: | positive electrode |
| 12: | negative electrode |
| 11a, 12a: | uncoated regions |
| 13: | separator |
| 20: | case |
| 30: | cap plate |
| 31, 32, 33, 34: | first, second, third, and fourth connection portions |
| 311, 331: | first and second protrusions |
| 312, 332: | first and second grooves |
| 321, 341: | first and second polygonal grooves |
| 322: | protrusion |
| 342: | polygonal plate |
| 341a: | extension groove |
| 342a: | extension portion |
| 35: | flange |
| 40: | electrode terminal |
| 41, 42, 43, 44: | first, second, third, and fourth terminal holes |
| 51: | sealing valve |
| 52: | vent portion |
| 53: | gasket |
| 60: | current collecting member |
| 70, 80: | first and second insulators |

Figure 2:
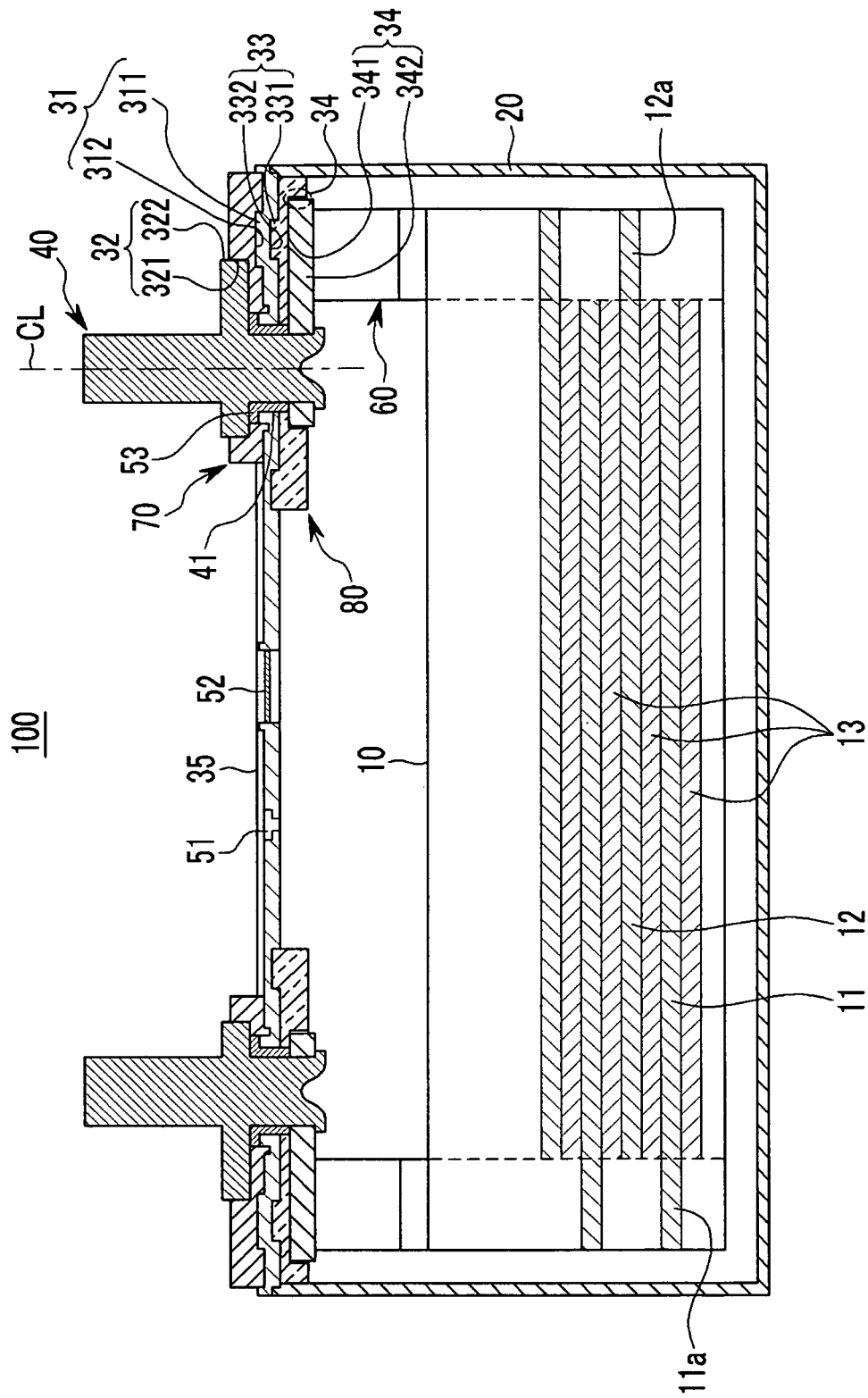
FIG. 2 illustrates a cross-sectional view of the rechargeable battery taken along the II-II line of FIG. 1.

FIG. 1 illustrates a perspective view of a rechargeable battery 100 according to a first example embodiment, and FIG. 2 illustrates a cross-sectional view of the rechargeable battery 100 taken along the II-II line of FIG. 1. Referring to FIG. 1 and FIG. 2, the rechargeable battery 100 according to the first example embodiment may include an electrode assembly 10 that is formed by winding positive and negative electrodes 11 and 12, with a separator 13 therebetween. The rechargeable battery 100 may also include a case 20 for containing and protecting the electrode assembly 10 therein, and a cap plate 30 fitted to close an opening of the case 20. An electrode terminal 40 may be electrically connected to the electrode assembly 10 and may provide an external electrical connection for the electrode assembly 10 by protruding through the cap plate 30. The electrode terminal 40 may extend through a terminal hole 41 of the cap plate 30, so as to provide an electrical connection from the electrode assembly 10 to the outside of the case 20.

The electrode assembly 10 may be formed with, e.g., a jelly-roll shape, by winding the positive electrode 11 and the negative electrode 12 with the separator 13. The separator 13 may be an insulator that is interposed between the electrodes 11, 12. The positive electrode 11 and the negative electrode 12 may each include a coated region, where a current collector formed of a thin metal foil is coated with an active material. The positive electrode 11 and the negative electrode 12 may respectively include uncoated portions 11a and 12a, where the current collector is not coated with the active material. The uncoated portions 11a and 12a may be formed at ends in length directions of the positive electrode 11 and the negative electrode 12, and may be placed on opposite sides to each other. The uncoated regions 11a and 12a may be connected to respective electrode terminals 40 through respective current collecting members 60.

The case 20 may form the whole outer shell of the rechargeable battery 100, and may be made of a conductive metal, such as aluminum, an aluminum alloy, or nickel-plated steel. The case 20 may form a space for incorporating the electrode assembly 10, and may be made in a rectangular shape of a hexahedron, as shown, or another suitable shape.

The cap plate 30 may be made of a thin plate material, and may close and seal the opening in the case 20. The cap plate 30 may be combined with the case 20 so as to close the opening formed on one side of the case 20. The cap plate 30 may have an electrolyte injection opening provided for injecting an electrolyte solution into the closed and sealed inner portion of the case 20. The electrolyte injection opening may be sealed by a sealing valve 51 to prevent leakage of the electrolyte solution. The cap plate 30 may also include a vent portion 52. The vent portion 52 may permanently or reversibly vent to the atmosphere in the event that pressure internal to the battery exceeds a predetermined pressure, so as to reduce or eliminate the possibility of explosion of the rechargeable battery 100.

The cap plate 30 and the electrode terminal 40 may be coupled to each other to maintain a closed and sealed structure for the rechargeable battery 100. In an implementation, the cap plate 30 and the electrode terminal 40 may be electrically insulated from one another.

Figure 3:
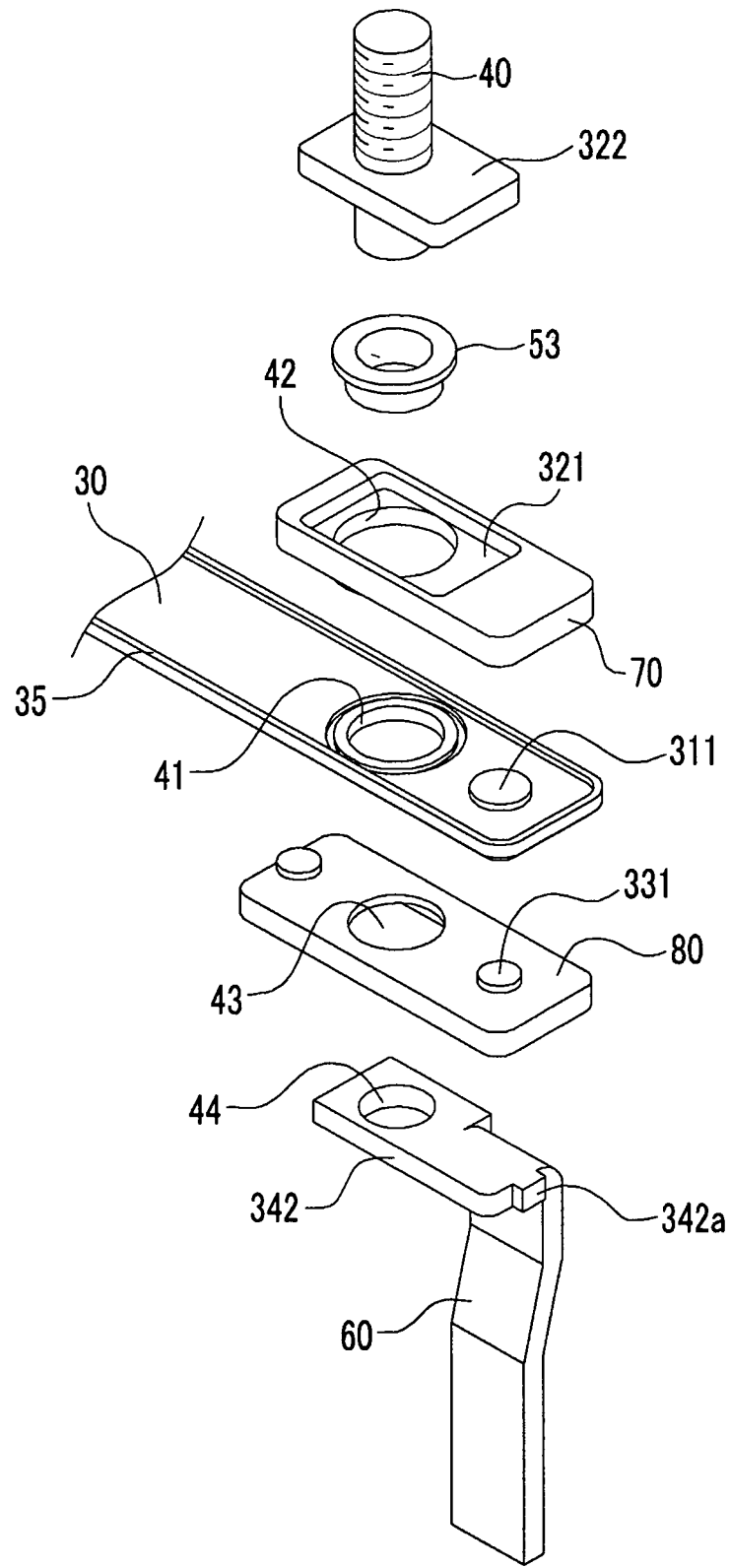
FIG. 3 illustrates an exploded view of a connection portion of the cap plate and the electrode terminal in FIG. 2, from the perspective of one looking down.
Figure 4:
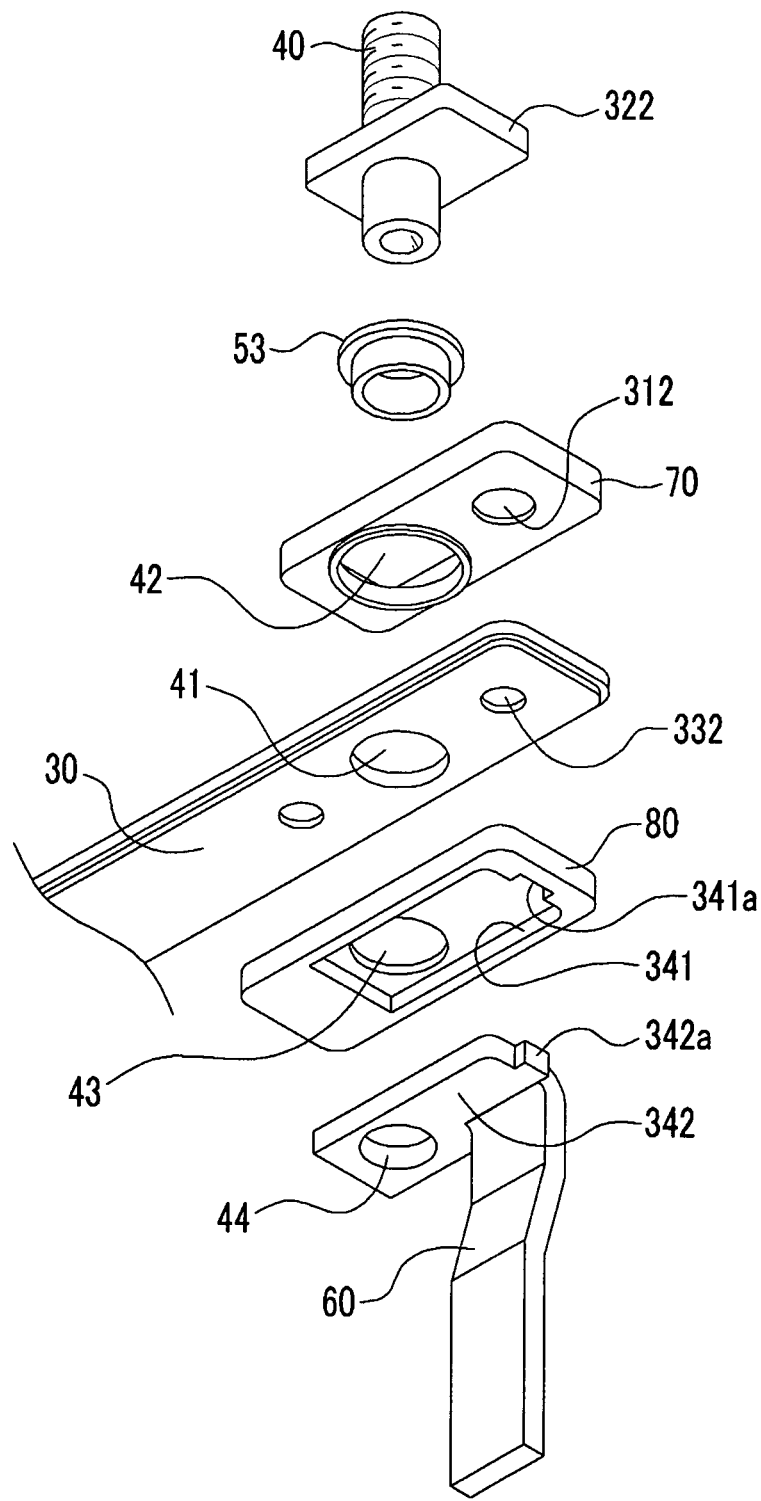
FIG. 4 illustrates an exploded view of the connection portion of FIG. 3, from the perspective of one looking up.

FIG. 3 illustrates an exploded view of a connection portion of the cap plate, and the electrode terminal in FIG. 2, from the perspective of one looking down, and FIG. 4 illustrates an exploded view of the connection portion of FIG. 3, from the perspective of one looking up. Referring to FIGS. 2 to 4, the rechargeable battery 100 according to the first example embodiment may include a first insulator 70 placed on the outer surface of the cap plate 30, and a second insulator 80 placed on the inner surface of the cap plate 30.

The rechargeable battery 100 may have a first connection portion 31 including a first protrusion 311 forming part of the cap plate 30 and a first groove 312 in the first insulator 70. The first connection portion 31 may be provided between the cap plate 30 and the first insulator 70 so as to positively engage the cap plate 30 and the first insulator 70. The rechargeable battery 100 may also have a second connection portion 32 including a protrusion 322 forming part of the electrode terminal 40 and a matching first polygonal groove 321 in the first insulator 70. The second connection portion 32 may be provided between the first insulator 70 and the electrode terminal 40 so as to positively engage the first insulator 70 and the electrode terminal 40. The rechargeable battery 100 may also have a third connection portion 33 including a second protrusion 331 forming part of the second insulator 80 and a matching second groove 332 in the cap plate 30. The third connection portion 33 may be provided between the cap plate 30 and the second insulator 80 so as to positively engage the cap plate 30 and the second insulator 80. The rechargeable battery 100 may also have a fourth connection portion 34 including a polygonal plate 342 forming part of the current collecting member 60 and a matching second polygonal groove 341 in the second insulator 80. The fourth connection portion 34 may be provided between the second insulator 80 and the current collecting member 60 so as to positively engage the second insulator 80 and the current collecting member 60. Each of the first, second, third, and fourth connection portions may be composed of opposed mating surfaces.

The example embodiment shown in FIGS. 1-4 provides a structure in which the first and second insulators 70 and 80 and the first, second, third, and fourth connection portions 31, 32, 33, and 34 are all included. However, in an implementation, the first insulator 70 may be used to form the insulating structure between the electrode terminal 40 and the cap plate 30, and the second insulator 80 may not be used (not shown). Further, in another implementation, the electrode terminal 40 may be stably connected to the current collecting member 60 without using the second insulator 80, in which case the third and fourth connection portions 33 and 34 may not be used (not shown).

Referring again to FIGS. 1-4, the electrode terminal 40 may be installed at the first terminal hole 41 of the cap plate 30. A second terminal hole 42 may be formed at the first insulator 70, a third terminal hole 43 may be formed at the second insulator 80, and a fourth terminal hole 44 may be formed at the current collecting member 60. The second, third, and fourth terminal holes 42, 43, and 44 may be aligned with the first terminal hole 41 along a central line (CL, referring to FIG. 2) that extends in the length direction of the externally-protruding portion of the electrode terminal 40.

A gasket 53 may be interposed between first, second, and third terminal holes 41, 42, and 43, and the electrode terminal 40. The gasket 53 may seal the coupling portion of the electrode terminal 40 to the cap plate 30.

The first connection portion 31 may be formed between the cap plate 30 and the first insulator 70 thereby combining them. The first connection portion may be eccentrically positioned, i.e., offset to one side, with respect to the center of the first and second terminal holes 41 and 42 coinciding with the central line CL of the electrode terminal 40.

In the structure described above, the central line CL of the electrode terminal 40, which may receive the torque of a nut (not shown) when an electrical wire is connected to the terminal 40, may be separated from the first connection portion 31 when assembling the rechargeable battery 100 such that the first insulator 70 maintains the state in which the first insulator 70 is fixed at the outside surface of the cap plate 40. Thus, to fix the first insulator 70 at the outside surface of the cap plate 40 without rotation, the first connection portion 31 may be provided.

A flange 35 may protrude around the external circumference of the cap plate 30. The first insulator 70 may have a facing surface of which at least one side surface is supported by the flange 35. As shown in FIG. 3 and FIG. 4, the first insulator 70 may be formed with a polygonal plate shape that corresponds to and is shaped to match the flange 35 along three edges of the insulator 70 (where the fourth side faces the middle of the cap plate 30).

The first protrusion 311 of the first connection portion 31 may protrude outside at the outer surface of the cap plate 30, and the first groove 312 concavely formed on the facing surface of the first insulator 70 may engage with the first protrusion 311. The first protrusion 311 and the first groove 312 may be disposed between the end of the cap plate 30 in the length direction and the first and second terminal holes 41 and 42.

With the first insulator 70 placed on the outer surface of the cap plate 30, the first protrusion 311 and the first groove 312 may be combined with each other at a position eccentric to, i.e., offset from, the central line CL of the first and second terminal holes 41 and 42. Thus, rotation of the first insulator 70, effected by torque transmitted to the first insulator 70 through rotation of a binding nut around the central line CL of the electrode terminal 40, may be prevented.

With the second connection portion 32 placed between the first insulator 70 and the electrode terminal 40, the first insulator 70 and the electrode terminal 40 may be connecting to each other. Here again, the second portion 32 may be eccentric to the central line CL of the electrode terminal 40, i.e., offset to one side.

The first polygonal groove 321 may be shaped as a polygon that encompasses at least the second terminal hole 42 of the first insulator 70 so as to extend beyond the second terminal hole 42. The protrusion 322 may protrude to one side of the electrode terminal 40 so as to mate with to the first polygonal groove 321. The first polygonal groove 321 and the protrusion 322 may be offset from the first protrusion 311 and the first groove 312

The protrusion 322 of the electrode terminal 40 and the first polygonal groove 321 of the first insulator 70 may be eccentric with respect to the central line CL of the second terminal hole 42, and may be offset to one end of the length direction of the cap plate 30. In an implementation, the protrusion 322 and the corresponding first polygonal groove 321 may each be made as a rectangle.

With the electrode terminal 40 inserted into the first insulator 70, the protrusion 322 of the electrode terminal 40 and the first polygonal groove 321 of the first insulator 70 may be combined to each other at a position spaced apart from the central line CL of the second terminal hole 42, such that rotation of the electrode terminal 40 may be prevented against the torque transmitted to the electrode terminal 40.

The third connection portion 33 may be formed between the cap plate 40 and the second insulator 80, thereby combining them to each other, and may be eccentric to the one side with respect to the center of the first and third terminal holes 41 and 43 corresponding to the central line CL of the electrode terminal 40.

The third connection portion 33 may include the second protrusion 331, protruding from the outwardly-facing surface of the second insulator 80, and the second groove 332, having a concave shape on the facing surface of the cap plate 30 and corresponding to the second protrusion 331. The second protrusion 331 and the second groove 332 may be formed between one end of the cap plate 30 in the length direction and the third and fourth terminal holes 43 and 44. The second protrusion 331 and the second groove 332 may be placed on a same side of the central line CL as the extending direction of the first polygonal groove 321 and the protrusion 322.

With the second insulator 80 placed in the inner surface of the cap plate 30, the second protrusion 331 and the second groove 332 may be combined at a position spaced from the central line CL of the third and fourth terminal holes 43 and 44, such that rotation of the second insulator 80 may be prevented against the torque transmitted to the second insulator 80 through the electrode terminal 40.

The fourth connection portion 34 may be formed between the second insulator 80 and the current collecting member 60 thereby combining them, and may be eccentric to one side with respect to the central line CL of the third and fourth terminal holes 43 and 44 corresponding to the central line CL of the electrode terminal 40.

The second polygonal groove 341 may be formed as a polygon that encompasses at least the fourth terminal hole 44 of the current collecting member 60. The second polygonal groove 341 may also extend beyond the third terminal hole 43 of the second insulator 80. The polygonal plate 342 may be formed as a polygon at the current collecting member 60, and may be shaped to match and be combined with the corresponding second polygonal groove 341. The second polygonal groove 341 and the polygonal plate 342 may be disposed between the one end of the cap plate 30 of the length direction and the third and fourth terminal holes 43 and 44. The second polygonal groove 341 and the polygonal plate 342 may be eccentric, e.g., as an offset a rectangle, to one end of the cap plate 30 in the length direction with respect to the third and fourth terminal holes 43 and 44.

In an implementation, the second polygonal groove 341 and the polygonal plate 342 may further include a respective extension groove 341a and extension portion 342a that are respectively extended away from the third and fourth terminal holes 43 and 44. The extension groove 341a and the extension portion 342a may be shaped to match and be mated with each other. The second polygonal groove 341 and the polygonal plate 342 may extend from the central line CL in a direction of the second protrusion 331 and the second groove 332.

With the polygonal plate 342 of the current collecting member 60 disposed on the outer surface of the second insulator 80, the second polygonal groove 341 and the polygonal plate 342 may be combined to each other at a position spaced from, i.e., eccentric to, the central line CL of the third and fourth terminal holes 43 and 44, such that the rotation of the second insulator 80 and the current collecting member 60 may be prevented against the torque transmitted to the second insulator 80 and the current collecting member 60 through the electrode terminal 40.

In an implementation, two or more of the first, second, third, and fourth connection portions 31, 32, 33, and 34 may be formed offset from the central line CL of the electrode terminal 40. Increasing the number of the first, second, third, and fourth connection portions 31, 32, 33, and 34 that are formed offset from the central line CL may help prevent rotation of the electrode terminal 40.

As described above, a rechargeable battery may include one or more structures engaging with one another and offset from a central line of a binding portion, e.g., a threaded stud, of an electrode terminal, which may help prevent rotation of the electrode terminal when torque is applied thereto, e.g., during tightening of a fastener such as a nut that clamps a wire. Thus, embodiments may be suitable for large, high-current batteries, automated assembly procedures, etc., whereby torque is applied to the electrode terminals of the battery.

Further, as described above, the rechargeable battery may have electrically insulating structures that are configured to minimize the likelihood of insulation failure and attendant short circuits. In contrast, coupling an electrode terminal to a cap plate with a caulking method, whereby an insulating resin is coated between the cap plate and the electrode terminal, may be subject to damage and electrical breakdown as a result of torque applied to the electrode terminal. Further, as compared to the use of an insulating resin, the rechargeable battery according to the above-described embodiments may be less expensive to manufacture.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery, comprising:
a case housing an electrode assembly, the case having an opening for receiving the electrode assembly;
a cap plate combined with the opening so as to close the case;
a first insulator on an outer surface of the cap plate;
an electrode terminal electrically connected to the electrode assembly, the electrode terminal extending through a first terminal hole in the cap plate and a second terminal hole in the first insulator;
a first connection portion that mates the cap plate to the first insulator so as to oppose rotation of the first insulator relative to the cap plate, the first connection portion being eccentric with respect to a central line of the first terminal hole, wherein the central line of the first terminal hole is axial to the first terminal hole and extends perpendicular to a plane of the first terminal hole; and
a second connection portion that mates the first insulator to the electrode terminal so as to oppose rotation of the electrode terminal relative to the first insulator, the second connection portion being eccentric with respect to the central line of the first terminal hole.

2. The battery as claimed in claim 1, wherein the first connection portion includes:
a first protrusion that protrudes from the outer surface of the cap plate, and
a first groove formed concavely on a facing surface of the first insulator in a location corresponding to the first protrusion, the first groove mating to the first protrusion.

3. The battery as claimed in claim 2, wherein the first protrusion is between the first terminal hole and one end of the cap plate in the length direction.

4. The battery as claimed in claim 1, wherein the second connection portion includes:
a first polygonal groove in the first insulator, the first polygonal groove having a polygon shape in a plane parallel to the cap plate, the first polygonal groove encompassing an area that extends beyond the second terminal hole, and
a protrusion portion of the electrode terminal, the protrusion portion of the electrode terminal having a shape mating with the first polygonal groove.

5. The battery as claimed in claim 4, wherein:
the first polygonal groove and the protrusion portion are offset to one end of the cap plate in the length direction so as to be eccentric with respect to the central line of the second terminal hole of the first insulator, and
the first polygonal groove has a rectangular shape.

6. The battery as claimed in claim 1, further comprising:
a second insulator on an inner surface of the cap plate, the second insulator having a third terminal hole that is coaxial with the first terminal hole and corresponds to the electrode terminal;
a current collecting member connected to the electrode assembly and having a fourth terminal hole corresponding to the electrode terminal; and
a third connection portion between the cap plate and the second insulator, the third connection portion mating the cap plate to the second insulator and being eccentric with respect to the central line of the first terminal hole.

7. The battery as claimed in claim 6, wherein the third connection portion includes:
a second protrusion that protrudes from an outer surface of the second insulator, and
a second groove formed concavely on a facing surface of the cap plate in a location corresponding to the second protrusion, the second groove mating to the second protrusion.

8. The battery as claimed in claim 6, further comprising a fourth connection portion between the second insulator and the current collecting member, the fourth connection portion mating the second insulator to the current collecting member and being eccentric with respect to the central line of the first terminal hole.

9. The battery as claimed in claim 8, wherein the fourth connection portion includes:
a second polygonal groove in the second insulator, the second polygonal groove having a polygon shape that encompasses an area that extends beyond the third terminal hole, and
a polygonal plate portion of the current collecting member, the polygonal plate having a shape mating with the second polygonal groove.

10. The battery as claimed in claim 9, wherein the second polygonal groove and the polygonal plate are formed as a rectangle eccentric to one end of the cap plate in the length direction with respect to the third terminal hole.

11. The battery as claimed in claim 10, wherein:
the second polygonal groove further includes an extension groove,
the polygonal plate further includes an extension portion,
the extension groove and the extension portion each extend away from the third terminal hole, and
the extension groove mates with the extension portion.

12. The battery as claimed in claim 6, wherein the first connection portion, the second connection portion, and the third connection portion are each offset from the central line of the first terminal hole in a common direction.

13. The battery as claimed in claim 6, further comprising a gasket that is interposed in the first terminal hole between the cap plate and the electrode terminal, in the second terminal hole between the first insulator and the electrode terminal, and in the third terminal hole between the second insulator and the electrode terminal.

14. The battery as claimed in claim 1, wherein the first connection portion and the second connection portion are each offset from the central line of the first terminal hole in a common direction.

15. A battery, comprising:
a case housing an electrode assembly, the case having an opening for receiving the electrode assembly;
a cap plate combined with the opening so as to close the case;
an insulator on the outer surface of the cap plate, the insulator being supported against rotation of the insulator with respect to the cap plate by a flange at an external circumference of the cap plate;
an electrode terminal electrically connected to the electrode assembly, the electrode terminal extending through a first terminal hole in the cap plate and a second terminal hole in the insulator; and
a connection portion that mates the insulator to the electrode terminal so as to oppose rotation of the electrode terminal relative to the insulator, the connection portion being eccentric with respect to a central line of the first terminal hole, wherein the central line of the first terminal hole is axial to the first terminal hole and extends perpendicular to a plane of the first terminal hole.

16. The battery as claimed in claim 15, wherein the insulator has at least one surface facing the flange, the at least one surface being supported by the flange.

17. The battery as claimed in claim 16, wherein the insulator has a polygonal plate portion, the polygonal plate portion having three sides supported by the flange.

18. The battery as claimed in claim 15, wherein the connection portion includes:
a polygonal groove in the insulator, the polygonal groove having a polygon shape in a plane parallel to the cap plate, the polygonal groove encompassing that encompasses an area that extends beyond the second terminal hole, and
a protrusion portion of the electrode terminal, the protrusion having a shape mating with the polygonal groove.

19. The battery as claimed in claim 18, wherein the polygonal groove and the protrusion portion are formed as a rectangle eccentric to one end of the cap plate in the length direction with respect to the second terminal hole.

* * * * *